United States Patent
Tang et al.

(10) Patent No.: US 11,546,909 B2
(45) Date of Patent: Jan. 3, 2023

(54) POWER ALLOCATION METHOD AND DEVICE OF INTERNET OF VEHICLES SYSTEM

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 15 days.

(21) Appl. No.: 16/930,113

(22) Filed: Jul. 15, 2020

(65) Prior Publication Data
US 2020/0367250 A1    Nov. 19, 2020

Related U.S. Application Data

(63) Continuation of application No. PCT/CN2018/111927, filed on Oct. 25, 2018.

(51) Int. Cl.
| | |
|---|---|
| *H04W 72/04* | (2009.01) |
| *H04W 4/40* | (2018.01) |
| *H04W 28/02* | (2009.01) |
| *H04W 72/12* | (2009.01) |
| *H04W 92/18* | (2009.01) |

(52) U.S. Cl.
CPC ......... *H04W 72/0473* (2013.01); *H04W 4/40* (2018.02); *H04W 28/0268* (2013.01); *H04W 72/1247* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2018/0014262 A1* | 1/2018 | Lee | H04W 52/30 |
| 2019/0182789 A1 | 6/2019 | Kim et al. | |
| 2020/0154373 A1* | 5/2020 | Lu | H04W 52/226 |
| 2020/0163023 A1* | 5/2020 | Pelletier | H04W 72/042 |

FOREIGN PATENT DOCUMENTS

| | | |
|---|---|---|
| CN | 105191465 A | 12/2015 |
| CN | 106465388 A | 2/2017 |
| CN | 106792425 A | 5/2017 |
| EP | 3358892 A1 | 8/2018 |
| WO | 2017030422 A1 | 2/2017 |
| WO | 2017057321 A1 | 4/2017 |

(Continued)

OTHER PUBLICATIONS

EPO, Extended European Search Report for European Patent Application No. 18901099.4. dated Jan. 12, 2021. 11 pages.

(Continued)

*Primary Examiner* — Mohammad S Adhami
(74) *Attorney, Agent, or Firm* — Perkins Coie LLP

(57) ABSTRACT

The present application provides a power allocation method and device of an Internet of Vehicles system, wherein a multi-carrier technology is adopted for a side link of the internet of vehicles system, and the method comprises: allocating power for a data transmission of a sidelink according to a preconfigured priority criterion.

15 Claims, 1 Drawing Sheet

(56) References Cited

FOREIGN PATENT DOCUMENTS

WO    2017158515 A1    9/2017
WO    2017191973 A1    11/2017

OTHER PUBLICATIONS

LG Electronics, "Discussion on power control for simultaneous SL TX and WAN TX in different carriers, 3GPP DRAFT, R1-1609188" Oct. 10-14, 2016, 2 pages.
Nokia et al., "Tx power allocation in SL CA: 3GPP DRAFT, R1-1720486" Nov. 27, 2017-Dec. 1, 2017, 2 pages.
NTT Docomo, Inc., "On carrier aggregation using mode 4 resource selection: 3GPP DRAFT, R-1718165" Oct. 9-13, 2017, 2 pages.
TSG RAN WG1, "LS on RAN 1 agreement on UL power sharing for LTE/NR NSA operation: 3GPP DRAFT, R2-1714162" Nov. 27, 2017-Dec. 1, 2017, 2 pages.
3GPP TSG RAN Meeting #80, La Jolla, USA, Jun. 11-14, 2018—RP-181429—Vodafone, New SID: Study on NR V2X (5 pages).
Hua Wei et al. "3GPP TSG RAN Meeting #78. RP-172486" On Rel-16 NR-V2X, Dec. 21, 2017 (Dec. 21, 2017)l, entire document.
International Search Report dated Oct. 10, 2018 of PCT/CN2018/073050 (4 pages).
International Search Report dated Jan. 15, 2019 of PCT/CN2018/111927 (4 pages).

\* cited by examiner

POWER ALLOCATION METHOD AND DEVICE OF INTERNET OF VEHICLES SYSTEM

CROSS-REFERENCE TO RELATED APPLICATION

The present application is a continuation application of International PCT Application No. PCT/CN2018/111927 having an international filing date of Oct. 25, 2018, which claims the priority to a PCT application No. PCT/CN2018/073050, filed on Jan. 17, 2018, and entitled "Power Distribution Method and Device of Internet of Vehicles System". The present application claims priority and the benefit of the above-identified applications and the above-identified applications are incorporated by reference herein in their entirety.

TECHNICAL FIELD

The present disclosure relates to the technical field of wireless communication, in particular, to a method and a device for power allocation of an internet of vehicles system.

Background

An internet of vehicles system is a sidelink transmission technology based on Long Term Evaluation (LTE)-Device to Device (D2D). Different from receiving or sending data by a base station in a traditional LTE system, the internet of vehicles system adopts a direct communication mode of D2D, and thus it has a higher spectral efficiency and a lower transmission delay.

With a continuous development of communication technology, the internet of vehicles system based on the communication technology is also continuously optimized, such as carrier aggregation, transmit diversity and other functions. For a terminal, since multi-carrier technology is used in the sidelink, a problem of insufficient power may be faced, but a solution to this problem is still in a technology gap.

SUMMARY

In view of this, a method and a device for power allocation of an internet of vehicles system are provide by the present disclosure, so as to solve the problem of the power allocation of the terminal of the internet of vehicles.

In one aspect, there is provided a method for power allocation of an internet of vehicles system, wherein a multi-carrier technology is adopted for a sidelink of the internet of vehicles system, including:

allocating power for data transmission of a sidelink according to a preconfigured priority criterion.

In another aspect, there is provided a method for power allocation of an internet of vehicles system, including:

sending, by a network side, parameter information used for power allocation of a user terminal to the user terminal.

In another aspect, there is provided a device for power allocation of an internet of vehicles system, wherein a multi-carrier technology is adopted for a sidelink of the internet of vehicles system, including:

a power allocation unit, configured to allocate power for data transmission of a sidelink according to a preconfigured priority criterion.

In another aspect, there is also provided a device for power allocation of an internet of vehicles system, arranged on a network side, including:

a parameter configuration unit, configured to send parameter information used for the power allocation of a user terminal to the user terminal.

According to a specific implementation mode of the present disclosure, the parameter configuration unit is specifically configured to send the parameter information to the user terminal through RRC signaling or MAC signaling.

There is also provided an apparatus, including:

one or more processors;

memory;

one or more programs stored in the memory, wherein the one or more programs, when executed by the one or more processors, are used for performing operations in the above methods.

There is also provided a storage medium containing computer executable instructions, wherein the computer-executable instructions, when executed by a computer processor, are used for performing operations in the above methods.

As may be seen from the above technical solution, in the present disclosure, it is illustrated to allocate power for data transmission of a sidelink according to a preconfigured priority criterion, thus solving the problem of the power allocation of the terminal in the internet of vehicles system and filling in the technology gap.

DETAILED DESCRIPTION

Figure 1:
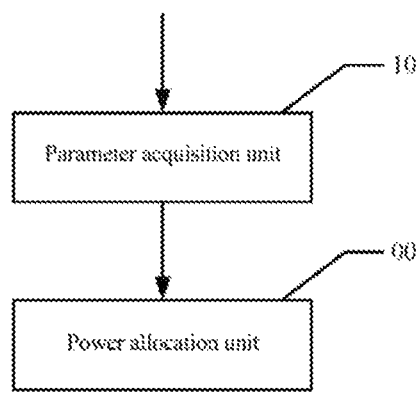
FIG. 1 is a schematic structural diagram of a device arranged at a terminal side provided by an implementation of the present disclosure.

In order to make the object, technical solution and advantages of the present disclosure clearer, the present disclosure will be described in detail with reference to the drawings and specific implementations in the following.

The core idea of the present disclosure is that, for the internet of vehicles system in which the multi-carrier technology is used for a sidelink, the terminal may allocate power for the data transmission of the sidelink according to a preconfigured priority criterion. The method for power allocation provided by the present disclosure will be described in detail through different implementations.

Implementation One

A terminal may allocate power for data transmission of a sidelink according to a Prose Per-Packet Priority (PPPP) of data to be transmitted on the sidelink.

For a resource allocation mode independently selected by the terminal, such as sidelink TM1 mode and sidelink TM3 mode, various applications on an upper layer of the terminal send data packets to a lower layer to form a resource pool, and when the data packets are further transmitted to the lower layer, a priority configuration is performed on the data packets in the resource pool to be labeled, namely, PPPP. The PPPP may be divided into 8 groups at most with values of 0~7. The smaller the PPPP value, the higher the priority of the transmission of the data packets. In Implementation one of the present disclosure, the power may be allocated for the data transmission of the sidelink according to the PPPP of the data to be transmitted on the sidelink, for example, the power is preferentially allocated for the data transmission with a high PPPP.

Implementation Two

A terminal may allocate power for a data transmission of a sidelink according to a Quality of Service (QoS) attribute of data to be transmitted on the sidelink.

The QoS attribute may include indexes such as availability, throughput, delay, delay variation (including jitter and drift) and packet loss rate. In the Implementation one of the present disclosure, the power may be allocated for the data transmission of the sidelink according to the QoS attribute of the data to be transmitted on the sidelink, for example, the power is preferentially allocated for the data transmission with a high QoS.

When allocating the power for the data transmission of the sidelink according to the QoS attribute of the data to be transmitted on the sidelink, it may be based on one of the indexes, for example, based on the throughput. The power is preferentially allocated for the data transmission with a high throughput. The QoS score may also be determined based on more than one index together, and the power is preferentially allocated for the data transmission with a highest QoS score.

Implementation Three

A terminal may first determine a channel type adopted by data to be transmitted on a sidelink, and allocate power for data transmission of the sidelink according to a preconfigured first priority of the channel type.

For the sidelink where the multi-carrier technology is adopted, multiple channel types may be adopted for the data transmission, such as Physical Sidelink Control Channel (PSCCH), Physical Sidelink Shared Channel (PSSCH), Sidelink Synchronization Signal (SLSS), and Physical Broadcast Channel (PBCH). Wherein the first priority of the channel type may be preconfigured for the power allocation, for example, the channel priority of the PSCCH and the PSSCH is configured to be higher than that of the SLSS and the PBSCH.

Implementation Four

A terminal may first determine a channel type adopted by data to be transmitted on a sidelink, and allocate power for data transmission of a sidelink according to a preconfigured first priority of the channel type. For example, the channel priority of PSCCH and PSSCH is configured higher than that of SLSS and PBSCH.

For the data of the same first priority of the channel type, the power is allocated to a corresponding data transmission according to a priority PPPP of the data. For example, the PSCCH and the PSSCH have the same channel priority. For the data transmitted by adopting the PSCCH and the PSSCH, the power may be allocated for the corresponding data transmission according to the PPPP of the data.

Or, for the data of the same first priority of the channel type, the power is allocated for a corresponding data transmission according to a QoS attribute of the data. For example, the PSCCH and the PSSCH have the same channel priority. For the data transmitted by adopting the PSCCH and the PSSCH, the power may be allocated for the corresponding data transmission according to the QoS attribute of the data.

As an implementation mode, the first priority of the channel type may be preconfigured at the terminal. As another implementation mode, the first priority of the channel type may also be previously sent to the terminal by a base station through RRC signaling or MAC signaling.

Implementation Five

If an internet of vehicles system includes an LTE system and an NR (5G New Radio) system, a terminal may allocate power greater than or equal to a preset first lowest power threshold (e.g., expressed as MIN1) to the LTE system for data transmission of a sidelink in the LTE system and power greater than or equal to a preset second lowest power threshold (e.g., expressed as MIN2) to the NR system for the data transmission of a sidelink in the NR system.

That is, the power allocated for the data transmission of the sidelink in the LTE system is not less than MIN1, and the power allocated for the data transmission of the sidelink in NR system is not less than MIN2. Wherein, MIN1 and MIN2 may be configured according to QoS of service, terminal power capability, etc.

The terminal may also allocate power less than or equal to a preset first highest power threshold (e.g., expressed as MAX1) to the LTE system for the data transmission of a sidelink in the LTE system and power less than or equal to a preset second highest power threshold (e.g., expressed as MAX2) to the NR system for the data transmission of a sidelink in the NR system. Wherein, MAX1 and MAX2 may be configured according to QoS of service, terminal power capability, etc.

That is, the power allocated for the data transmission of the sidelink in the LTE system is not higher than MAX1, and the power allocated for the data transmission of the sidelink in the NR system is not higher than MAX2.

The values of MIN1, MIN2, MAX1 and MAX2 may be preconfigured at the terminal, or may be sent to the terminal by the base station through RRC signaling or MAC signaling.

If there is still remaining power besides a sum of the power allocated to the LTE system and the power allocated to the NR system, for example, the terminal still has remaining power after allocating power greater than or equal to MIN1 to the LTE system and power greater than or equal to MIN2 to the NR system, then the terminal may increase the power allocated to the LTE system and the NR system according to a preset proportion value. Wherein, the preset proportion value may be a ratio of MIN1 to MIN2. Preferably, this mode may be applied to a case where the LTE system and the NR system are synchronous.

Another allocation mode may also be adopted. If the sum of the power allocated to the LTE system and the power allocated to the NR system is greater than total power of the terminal, for example, after allocating power less than or equal to MAX1 to the LTE system and power less than or equal to MAX2 to the NR system, the power allocated to the LTE system and the NR system is reduced according to a preset proportion value. The preset proportion value may be a ratio of MAX1 to MAX2. Preferably, this mode may be applied to a case where the LTE system and the NR system are synchronous.

Another allocation mode may also be adopted. If the sum of the power allocated to the LTE system and the power allocated to the NR system is greater than the total power of the terminal, the power allocated to the LTE system and the NR system is reduced according to a preset third priority. Wherein, the preset third priority may include, for example, preferentially reducing transmission power of the sidelink with the QoS attribute state is less than the preset first threshold, or preferentially reducing transmission power of an uplink when the QoS attribute state of the sidelink is higher than the preset second threshold. Preferably, this mode may be applied to a case where the LTE system and the NR system are synchronous.

If there is still remaining power besides the sum of the power allocated to the LTE system and the power allocated to the NR system, for example, there is still remaining power after allocating the power greater than or equal to MIN1 to the LTE system and the power greater than or equal to MIN2 to the NR system, the remaining power may be preferentially allocated for data transmission starting firstly. Preferably, this mode may be applied to a case where the LTE system and the NR system are asynchronous.

If there is still remaining power besides the sum of the power allocated to LTE system and the power allocated to NR system, for example, if there is still remaining power after allocating power greater than or equal to MIN1 to the LTE system and power greater than or equal to MIN2 to the NR system, the remaining power is allocated according to a second priority of a channel type or the QoS attibute. When allocating the remaining power according to the second priority of the channel type, power allocation may be performed, as a whole, for the channels adopted for the data to be transmitted in the LTE system and the NR system according to the second priority of the channel type. Preferably, this mode may be applied to a case where the LTE system and the NR system are synchronous.

Wherein, allocating the remaining power according to the QoS attribute state may include: preferentially increasing transmission power of the sidelink with the QoS attribute state being higher than a preset seven threshold, or preferentially increasing transmission power of the uplink when the QoS attribute state of the sidelink is less than the preset seven threshold.

In an implementation of the present disclosure, the first priority of the channel type refers to a priority according to which the power allocation is performed for various channels within the same system. The second priority of the channel type refers to a priority according to which the power allocation is performed jointly for various channels of the LTE system and the NR system.

Another implementation mode may also be adopted. Data transmission of the LTE system and data transmission of the NR system are not performed at the same time. Preferably, this mode may be applied to a case where the LTE system and the NR system are asynchronous.

Implementation Six

In this implementation, an effect of Uu interface is taken into account, that is, an uplink is taken into account at the same time. An LTE system and/or an NR system may also include the uplink. That is, the LTE system may include at least one of a sidelink and an uplink, and the NR system may include at least one of a sidelink and an uplink. However, in a scenario to which the present disclosure is applied, at least one of the LTE system and the NR system includes a sidelink. For example, following scenarios may be included.

Scenario one: the LTE system includes the uplink and the sidelink, and the NR system includes the uplink and the sidelink.

Scenario two: the LTE system includes the uplink, and the NR system includes the sidelink.

Scenario three: the LTE system includes the sidelink, and the NR system includes the uplink.

Scenario four: the LTE system includes the uplink, and the NR system includes the uplink and the sidelink.

Scenario five: the LTE system includes the sidelink, and the NR system includes the uplink and the sidelink.

Scenario six: the LTE system includes the uplink and the sidelink, and the NR system includes the uplink.

Scenario seven: the LTE system includes the uplink and the sidelink, and the NR system includes the sidelink.

Scenario eight: the LTE system includes the sidelink, and the NR system includes the sidelink.

In this implementation, the following implementation mode may be adopted.

If an internet of vehicles system includes both the LTE system and the NR system, a terminal may allocate power greater than or equal to a preset first lowest power threshold (for example, expressed as MIN1) to the LTE system and power greater than or equal to a preset second lowest power threshold (for example, expressed as MIN2) to the NR system.

The uplink and/or the sidelink in the LTE system uses the power allocated to the LTE system. The uplink and/or the sidelink in the NR system uses the power allocated to the NR system.

That is, the power commonly allocated for the data transmission of the sidelink and the uplink in the LTE system is not less than MIN1, and the power commonly allocated for the data transmission of the sidelink and the uplink in the NR system is not less than MIN2. Wherein, MIN1 and MIN2 may be configured according to Qos of service, terminal power capability, etc.

The terminal may also allocate power less than or equal to a preset first highest power threshold (for example, expressed MAX1) to the LTE system and power less than or equal to a preset second highest power threshold (for example, expressed MAX2) to the NR system. Wherein, MAX1 and MAX2 may be configured according to Qos of service, terminal power capability, etc.

That is, the power commonly allocated for the data transmission of the sidelink and the uplink in the LTE system is not higher than MAX1, and the power commonly allocated for the data transmission of the sidelink and the uplink in the NR system is not higher than MAX2.

Similarly, the values of above MIN1, MIN2, MAX1 and MAX2 may be preconfigured at the terminal, or may be sent to the terminal by a base station through RRC signaling or MAC signaling.

In the same LTE system, power may be preferentially allocated to the data transmission starting firstly in the sidelink and the uplink. For example, if the data in the uplink is preferentially transmitted, the power is preferentially allocated to the uplink. If the data in the sidelink is preferentially transmitted, the power is preferentially allocated to the sidelink. Similarly, in the same NR system, power may be preferentially allocated to the data transmission starting firstly in the sidelink and the uplink.

There is still remaining power besides a sum of the power allocated to the LTE system and the power allocated to the NR system. For example, the terminal still has remaining power after allocating power greater than or equal to MIN1 to the LTE system and power greater than or equal to MIN2 to the NR system, the terminal may increase the power allocated to the LTE system and the NR system according to a preset proportion value. Wherein, the power allocated to the LTE system, after being increased, is still commonly allocated to the sidelink and the uplink in the LTE system, and similarly, the power allocated to the NR system, after being increased, is also still commonly allocated to the sidelink and the uplink in the NR system. The preset proportion value may be a ratio of MIN1 to MIN2. Preferably, this mode may be applied to a case where the LTE system and the NR system are synchronous.

Another allocation mode may also be adopted. If the sum of the power allocated to the LTE system and the power allocated to the NR system is greater than the total power of the terminal, for example, after allocating power less than or equal to MAX1 to the LTE system and power less than or equal to MAX2 to the NR system, the power allocated to the LTE system and the NR system is reduced according to a preset proportion value. Wherein, the power allocated to the LTE system, after being reduced, is still commonly allocated to the sidelink and the uplink in the LTE system, and similarly, the power allocated to the NR system, after being reduced, is also still commonly allocated to the sidelink and the uplink in the NR system. The preset proportion value may be a ratio of MAX1 to MAX2. Preferably, this mode may be applied to a case where the LTE system and the NR system are synchronous.

Another allocation mode may also be adopted. If the sum of the power allocated to the LTE system and the power allocated to the NR system is greater than the total power of the terminal, the power allocated to the LTE system and the NR system is reduced according to a preset third priority. Wherein, the preset third priority may include, for example, preferentially reducing transmission power of the sidelink with the QoS attribute state being less than the preset first threshold, or preferentially reducing transmission power of an uplink when the QoS attribute state of the sidelink is higher than a preset second threshold. Wherein, the power allocated to the LTE system, after being reduced, is still commonly allocated to the sidelink and the uplink in the LTE system, and similarly, the power allocated to the NR system, after being reduced, is still commonly allocated to the sidelink and the uplink in the NR system. Preferably, this mode may be applied to a case where the LTE system and the NR system are synchronous.

If there is still remaining power besides the sum of the power allocated to the LTE system and the power allocated to the NR system, for example, if there is still remaining power after allocating the power greater than or equal to MIN1 to the LTE system and the power greater than or equal to MIN2 to the NR system, the remaining power may be preferentially allocated for data transmission starting firstly. Preferably, this mode may be applied to a case where the LTE system and the NR system are asynchronous.

If there is still remaining power besides the sum of the power allocated to LTE system and the power allocated to NR system, for example, if there is still remaining power after allocating power greater than or equal to MIN1 to the LTE system and power greater than or equal to MIN2 to the NR system, the remaining power may be allocated according to a second priority of a channel type. When allocating the remaining power according to the second priority of the channel type, power allocation may be performed, as a whole, for the channels adopted for the data to be transmitted in the LTE system and the NR system according to the second priority of the channel type. Preferably, this mode may be applied to a case where the LTE system and the NR system are synchronous.

Another implementation mode may also be adopted. Data transmission of the LTE system and data transmission of the NR system are not performed at the same time. Preferably, this mode may be applied to a case where the LTE system and the NR system are asynchronous.

In addition, in this implementation, the above synchronization and asynchronization situations are applied to the data transmission of the LTE uplink and the NR sidelink, and may also be applied to the data transmission of the LTE sidelink and the NR uplink, etc.

Implementation Seven

If an internet of vehicles system includes at least two cell groups at the same time, a base station may provide services of at least two cell groups for a terminal at the same time.

Taking a first cell group and a second cell group as an example, the base station may provide services of the first cell group and the second cell group for the terminal at the same time, wherein one cell group may include more than one communication system. For example, the first cell group may include an LTE system and/or an NR system, and the second cell group may include the LTE system and/or the NR system. When one cell group includes the LTE system and the other cell group includes the NR system, it may correspond to the cases of the Implementation five and the Implementation six.

If the base station may provide services of the first cell group and the second cell group for the terminal at the same time, the terminal may allocate power greater than or equal to a preset third lowest power threshold (for example, expressed as MIN3) to the first cell group for data transmission of a sidelink in the first cell group, and allocate power greater than or equal to a preset fourth lowest power threshold (for example, expressed as MIN4) to the second cell group for data transmission of the sidelink in the second cell group.

That is, the power allocated for the data transmission of the sidelink in the first cell group is not less than MIN3, and the power allocated for the data transmission of the sidelink in the second cell group is not less than MIN4. Wherein, MIN3 and MIN4 may be configured according to QoS of service, terminal power capability, etc.

The terminal may also allocate power less than or equal to a preset third highest power threshold (for example, expressed as MAX3) to the first cell group for the data transmission of the sidelink in the first cell group, and allocate power less than or equal to a preset fourth highest power threshold (for example, expressed as MAX4) to the second cell group for the data transmission of the sidelink in the second cell group. Wherein, MAX3 and MAX4 may be configured according to the QoS of service, terminal power capability, etc.

That is, the power allocated for the data transmission of the sidelink in the first cell group is not higher than MAX3, and the power allocated for the data transmission of the sidelink in the second cell group is not higher than MAX4.

The values of MIN3, MIN4, MAX3 and MAX4 may be preconfigured at the terminal, or may be sent to the terminal by the base station through RRC signaling or MAC signaling.

If there is still remaining power besides a sum of the power allocated to the first cell group and the power allocated to the second cell group, for example, the terminal still has remaining power after allocating power greater than or equal to MIN3 to the first cell group and power greater than or equal to MIN4 to the second cell group, the terminal may increase the power allocated to the first cell group and the second cell group according to a preset proportion value. Wherein, the preset proportion value may be a ratio of MIN3 to MIN4. Preferably, this mode may be applied to a case where the first cell group and the second cell group are synchronous.

If the sum of the power allocated to the first cell group and the power allocated to the second cell group is greater than total power of the terminal, for example, after allocating power less than or equal to MAX3 to the first cell group and power less than or equal to MAX4 to the second cell group, the power allocated to the first cell group and the second cell group is reduced according to a preset proportion value. The preset proportion value may be a ratio of MAX3 to MAX4. Preferably, this mode may be applied to a case where the first cell group and the second cell group are synchronous.

Another allocation mode may also be adopted. If the sum of the power allocated to the first cell group and the power allocated to the second cell group is greater than the total power of the terminal, for example, after allocating the power less than or equal to MAX3 to the first cell group and the power less than or equal to MAX4 to the second cell group, the power allocated to the first cell group and the second cell group is reduced according to a preset fourth priority. Wherein, the preset fourth priority may include: for example, preferentially reducing transmission power of the sidelink with the QoS attribute state being less than a preset third threshold, or preferentially reducing transmission power of an uplink when the QoS attribute state of the sidelink is higher than the preset third threshold. Preferably, this mode may be applied to a case where the first cell group and the second cell group are synchronous.

If there is still remaining power besides the sum of the power allocated to the first cell group and the power allocated to the second cell group, for example, there is still remaining power after allocating power greater than or equal to MIN3 to the first cell group and power greater than or equal to MIN4 to the second cell group, the remaining power may be allocated to the data transmission staring firstly. Preferably, this mode may be applied to a case where the first cell group and the second cell group are asynchronous.

If there is still remaining power besides the sum of the power allocated to the first cell group and the power allocated to the second cell group, for example, there is still remaining power after allocating power greater than or equal to MIN3 to the first cell group and power greater than or equal to MIN4 to the second cell group, the remaining power is allocated according to a third priority of a channel type or a QoS attribute state. When allocating the remaining power according to the third priority of the channel type, power allocation may be performed, as a whole, for the channels adopted for the data to be transmitted in the first cell group and the second cell group according to the third priority of the channel type. Preferably, this mode may be applied to a case where the first cell group and the second cell group are synchronous.

Allocating the remaining power according to the QoS attribute state includes: preferentially increasing transmission power of the sidelink with the QoS attribute state being higher than a preset eighth threshold, or preferentially increasing transmission power of an uplink when the QoS attribute state of the sidelink is less than the preset eighth threshold.

In an implementation of the present disclosure, the first priority of the channel type refers to a priority according to which the power allocation is performed for various channels within the same system. The second priority of the channel type refers to a priority according to which the power allocation is performed jointly for various channels of the LTE system and the NR system. The third priority of the channel type refers to a priority according to which the power allocation is performed jointly for various channels of the first cell group and the second cell group.

Another implementation mode may also be adopted. Data transmission of the first cell group and data transmission of the second cell group are not performed at the same time. Preferably, this mode may be applied to a case where the first cell group and the second cell group are asynchronous.

Implementation Eight

In this implementation, an effect of an Uu interface is taken into account, that is, an uplink is taken into account at the same time. A first cell group and/or a second cell group may further include an uplink. That is, the first cell group may include at least one of a sidelink and an uplink, and the second cell group may include at least one of a sidelink and an uplink. However, in a scenario to which the present disclosure is applied, at least one of the first cell group and second cell group includes a sidelink. For example, following scenarios may be included.

Scenario one: the first cell group includes the uplink and the sidelink, and the second cell group includes the uplink and the sidelink.

Scenario two: the first cell group includes the uplink, and the second cell group includes the sidelink.

Scenario three: the first cell group includes the sidelink, and the second cell group includes the uplink.

Scenario four: the first cell group includes the uplink, and the second cell group includes the uplink and the sidelink.

Scenario five: the first cell group includes the sidelink, and the second cell group includes the uplink and the sidelink.

Scenario six: the first cell group includes the uplink and the sidelink, and the second cell group includes the uplink.

Scenario seven: the first cell group includes the uplink and the sidelink, and the second cell group includes the sidelink.

Scenario eight: the first cell group includes the sidelink, and the second cell group includes the sidelink.

In this implementation, the following implementation mode may be adopted.

If an internet of vehicles system includes the first cell group and the second cell group at the same time, a terminal may allocate power greater than or equal to a preset third lowest power threshold (for example, expressed as MIN3) to the first cell group and power greater than or equal to a preset fourth lowest power threshold (for example, expressed as MIN4) to the second cell group.

The uplink and/or the sidelink in the first cell group uses the power allocated to the first cell group. The uplink and/or the sidelink in the second cell group uses the power allocated to the second cell group.

That is, the power commonly allocated for the data transmission of the sidelink and the uplink in the first cell group is not less than MIN3, and the power commonly allocated for the data transmission of the sidelink and the uplink in the second cell group is not less than MIN4. Wherein, MIN3 and MIN4 may be configured according to the Qos of service, terminal power capability, etc.

The terminal may also allocate power less than or equal to a preset third highest power threshold (for example, expressed MAX3) to the first cell group and power less than or equal to a preset fourth highest power threshold (for example, expressed MAX4) to the second cell group. Wherein, MAX3 and MAX4 may be configured according to the QoS of service, terminal power capability, etc.

That is, the power commonly allocated for the data transmission of the sidelink and the uplink in the first cell group is not higher than MAX3, and the power commonly allocated for the data transmission of the sidelink and the uplink in the second cell group is not higher than MAX4.

Similarly, the values of above MIN3, MIN4, MAX3 and MAX4 may be preconfigured at the terminal, or may be sent to the terminal by a base station through RRC signaling or MAC signaling.

In the same cell group, power may be preferentially allocated to the data transmission starting firstly in the sidelink and the uplink. For example, if the data in the uplink is preferentially transmitted, the power is preferentially allocated to the uplink. If the data in the sidelink is preferentially transmitted, the power is preferentially allocated to the sidelink.

Or, in the same cell group, power may be preferentially allocated to the data transmission of the sidelink with the QoS attribute state being greater than or equal to a preset fifth threshold.

OR, in the same cell group, if the QoS attribute state of the sidelink data is less than a preset sixth threshold, power is preferentially allocated to the uplink transmission.

If there is still remaining power besides a sum of the power allocated to the first cell group and the power allocated to the second cell group, for example, the terminal still has remaining power after allocating power greater than or equal to MIN3 to the first cell group and power greater than or equal to MIN4 to the second cell group, the terminal may increase the power allocated to the first cell group and the second cell group according to a preset proportion value. Wherein, the power allocated to the first cell group, after being increased, is still commonly allocated to the sidelink and the uplink in the first cell group, and similarly, the power allocated to the second cell group, after being increased, is also still commonly allocated to the sidelink and the uplink in the second cell group. The preset proportion value may be a ratio of MIN3 to MIN4. Preferably, this mode may be applied to a case where the first cell group and the second cell group are synchronous.

If the sum of the power allocated to the first cell group and the power allocated to the second cell group is greater than total power of the terminal, for example, another implementation mode may further be adopted. That is, after allocating power less than or equal to MAX3 to the first cell group and power less than or equal to MAX4 to the second cell group, the power allocated to the first cell group and the second cell group is reduced according to a preset proportion value. Wherein, the power allocated to the first cell group, after being reduced, is still commonly allocated to the sidelink and the uplink in the first cell group, and similarly, the power allocated to the second cell group, after being reduced, is also still commonly allocated to the sidelink and the uplink in the second cell group. The preset proportion value may be a ratio of MAX3 to MAX4. Preferably, this mode may be applied to a case where the first cell group and the second cell group are synchronous.

If there is still remaining power besides the sum of the power allocated to the first cell group and the power allocated to the second cell group, for example, there is still remaining power after allocating power greater than or equal to MIN3 to the first cell group and power greater than or equal to MIN4 to the second cell group, the remaining power may be allocated to the data transmission staring firstly. Preferably, this mode may be applied to a case where the first cell group and the second cell group are asynchronous.

If there is still remaining power besides the sum of the power allocated to the first cell group and the power allocated to the second cell group, for example, there is still remaining power after allocating power greater than or equal to MIN3 to the first cell group and power greater than or equal to MIN4 to the second cell group, the remaining power may be allocated according to a fourth priority of a channel type or a QoS attribute state. When allocating the remaining power according to the fourth priority of the channel type, power allocation may be performed, as a whole, for the channels adopted for the data to be transmitted in the first cell group and the second cell group according to the fourth priority of the channel type. Preferably, this mode may be applied to a case where the first cell group and the second cell group are synchronous.

Allocating the remaining power according to the QoS attribute state includes, preferentially increasing transmission power of the sidelink with the QoS attribute state being higher than a preset eighth threshold, or preferentially increasing transmission power of the uplink when the QoS attribute state of the sidelink is less than the preset eighth threshold.

Another implementation mode may also be adopted. Data transmission of the first cell group and data transmission of the second cell group are not performed at the same time. Preferably, this mode may be applied to a case where the first cell group and the second cell group are asynchronous.

In addition, in this implementation, the above synchronization and asynchronization situations are applied to the data transmission of the uplink of the first cell group and the sidelink of the second cell group, and also applied to the data transmission of the sidelink of the first cell group and the uplink of the second cell group, etc.

In the above implementations, parameter information used by the terminal for the power allocation is configured by the network side (such as the base station), wherein the parameter information includes at least one of the priority of the channel type (including the first priority of the channel type, the second priority of the channel type), the first lowest power threshold, the second lowest power threshold, the third lowest power threshold, the fourth lowest power threshold, the first highest power threshold, the second highest power threshold, the third highest power threshold, the fourth highest power threshold, the third threshold based on the QoS attribute state, a fourth threshold based on the QoS attribute state, the fifth threshold based on the QoS attribute state, the six threshold based on the QoS attribute state, a seventh threshold based on the QoS attribute state and the eighth threshold based on the QoS attribute state involved in the above implementations. When the network side performs the configuration of the above parameter information, the above parameter information may be sent to the terminal by RRC signaling or MAC signaling, etc.

It should be noted that restrictions of the first, second, third, fourth, etc. mentioned in the implementation of this application are only for distinguishing the objects defined, and do not have the meaning of order, size, etc. Substitutions of an expression will not affect the implementation of the technical solution. For example, the expression of the above third lowest power threshold is exchanged with the expression of the first lowest power threshold, the exchanging is merely a name substitution, does not represent a value substitution, and will not affect the implementation of the technical solution.

The above is a detailed description of the method provided by the present disclosure, and the following is a detailed description of a device provided by the present disclosure.

A device for power allocation is provided by present disclosure, applied to an internet of vehicles system, wherein a multi-carrier technology is adopted for a sidelink of the internet of vehicles system, and the device may be arranged at a terminal. As shown in FIG. 1, the device mainly includes a power allocation unit 00 and a parameter acquisition unit 10.

The power allocation unit 00 is configured to allocate power for data transmission of the sidelink according to a preconfigured priority criterion.

The parameter acquisition unit 10 is configured to acquire parameter information used for the power allocation from a base station.

Implementation Nine

The power allocation unit 00 may specifically allocate the power for the data transmission of the sidelink according to a ProSe Per-Packet Priority PPPP of the data to be transmitted on the sidelink.

For a resource allocation mode independently selected by the terminal, such as sidelink TM1 mode and sidelink TM3 mode, various applications on an upper layer of a terminal send data packets to a lower layer to form a resource pool, and when the data packets are further transmitted to the lower layer, a priority configuration is performed on the data packets in the resource pool to be labeled, namely, PPPP. The PPPP may be divided into 8 groups at most with values of 0~7. The smaller the PPPP value, the higher the priority of the transmission of the data packets. In Implementation six of the present disclosure, the power allocation unit may allocate the power for the data transmission of the sidelink according to the PPPP of the data to be transmitted on the sidelink, for example, the power is preferentially allocated for the data transmission with a high PPPP.

Implementation Ten

The power allocation unit 00 may specifically allocate power for the data transmission of the sidelink according to the Quality of Service (QoS) attribute of the data to be transmitted on the sidelink.

The QoS attribute may include indexes such as availability, throughput, delay, delay variation (including jitter and drift) and packet loss rate. In the Implementation one of the present disclosure, the power may be allocated for the data transmission of the sidelink according to the QoS attribute of the data to be transmitted on the sidelink, for example, the power is preferentially allocated for the data transmission with a high QoS.

When allocating the power for the data transmission of the sidelink according to the QoS attribute of the data to be transmitted on the sidelink, it may be based on one of the indexes, for example, based on the throughput. The power is preferentially allocated for the data transmission with a high throughput. The QoS score may also be determined based on more than one index together, and the power is preferentially allocated for the data transmission with the highest QoS score.

Implementation Eleven

Figure 2:
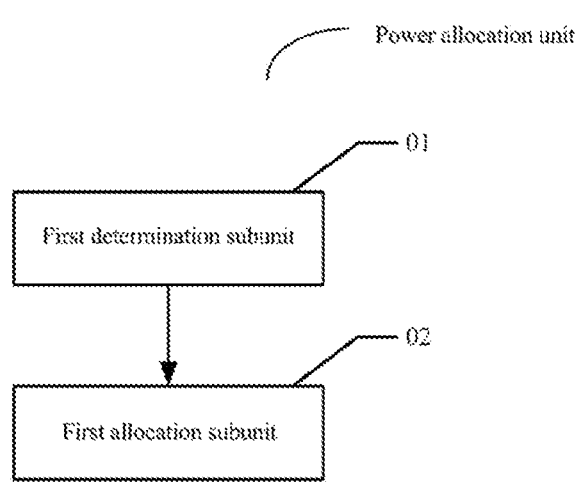
FIG. 2 is a schematic structural diagram of a power allocation unit provided by implementation seven of the present disclosure.

FIG. 2 is a schematic structural diagram of a power allocation unit provided by the implementation seven of the present disclosure. As shown in FIG. 2, the power allocation unit may include a first determination subunit 01 and a first allocation subunit 02. The main functions of various component units are as follows.

The first determination subunit 01 is responsible for determining a channel type used by data to be transmitted. Wherein, the data to be transmitted include data to be transmitted on a sidelink or data to be transmitted on the sidelink and an uplink.

The first allocation subunit 02 is responsible for allocating power for data transmission according to a preconfigured first priority of a channel type. For example, the channel priority of PSCCH and PSSCH is configured higher than that of SLSS and PBSCH.

As an implementation mode, the first priority of the channel type may be preconfigured at a terminal. As another implementation mode, the first priority of the channel type may also be previously sent to the terminal by a base station through RRC signaling or MAC signaling.

Implementation Twelve

Figure 3:
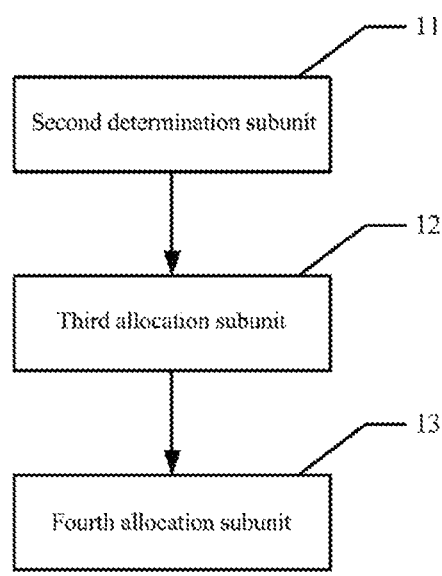
FIG. 3 is a schematic structural diagram of a power allocation unit provided by implementation eight of the present disclosure.

FIG. 3 is a schematic structural diagram of a power allocation unit provided by the implementation eight of the present disclosure. As shown in FIG. 3, a power allocation unit may include a second determination subunit 11, a third allocation subunit 12, and a fourth allocation subunit 13. The main functions of various component units are as follows.

The second determination subunit 11 is responsible for determining a channel type used by data to be transmitted. Wherein, the data to be transmitted includes data to be transmitted on a sidelink or data to be transmitted on the sidelink and an uplink.

The third allocation subunit 12 is responsible for allocating the power for the data transmission according to a preconfigured first priority of the channel type. For example, the channel priority of PSCCH and PSSCH is configured higher than that of SLSS and PBSCH.

The fourth allocation subunit 13 is configured to, for the data of the same first priority of the channel type, allocate the power for a corresponding data transmission according to a PPPP of the data. For example, the PSCCH and the PSSCH have the same channel priority. For the data transmitted by adopting the PSCCH and the PSSCH, the power may be allocated for the corresponding data transmission according to the PPPP or QoS of the data.

As an implementation mode, the first priority of the channel type may be preconfigured in a terminal. As another implementation mode, the first priority of the channel type may also be previously sent to the terminal by a base station through RRC signaling or MAC signaling.

Implementation Thirteen

If an internet of vehicles system includes an LTE system and an NR system, the power allocation unit 00 may allocate power greater than or equal to a preset first lowest power threshold (for example, expressed as MIN1) to the LTE system and power greater than or equal to a preset second lowest power threshold (for example, expressed as MIN2) to the NR system. Wherein, at least one of the LTE system and the NR system includes the sidelink.

If an internet of vehicles system includes an LTE system and an NR system, the power allocation unit 00 may allocate power less than or equal to a preset first highest power threshold (for example, expressed as MAX1) to the LTE system and power less than or equal to a preset second highest power threshold (for example, expressed as MAX2) to the NR system. Wherein, at least one of the LTE system and the NR system includes the sidelink.

MIN1, MIN2, MAX1 and MAX2 may be configured according to QoS of service, terminal power capability, etc. The values of above MIN1, MIN2, MAX1 and MAX2 may be preconfigured in a terminal, or may be sent to the terminal by a base station through RRC signaling or MAC signaling, etc.

Further, the LTE system and/or the NR system also includes an uplink. That is, the LTE system may include at least one of the sidelink and an uplink, and the NR system may include at least one of the sidelink and the uplink. However, in a scenario to which the present disclosure is applied, at least one of the LTE system and the NR system includes the sidelink. The following scenarios may be included.

Scenario one: the LTE system includes the uplink and the sidelink, and the NR system includes the uplink and the sidelink.

Scenario two: the LTE system includes the uplink, and the NR system includes the sidelink.

Scenario three: the LTE system includes the sidelink, and the NR system includes the uplink.

Scenario four: the LTE system includes the uplink, and the NR system includes the uplink and the sidelink.

Scenario five: the LTE system includes the sidelink, and the NR system includes the uplink and the sidelink.

Scenario six: the LTE system includes the uplink and the sidelink, and the NR system includes the uplink.

Scenario seven: the LTE system includes the uplink and the sidelink, and the NR system includes the sidelink.

Scenario eight: the LTE system includes the sidelink, and the NR system includes the sidelink.

The uplink and/or the sidelink in the LTE system uses the power allocated to the LTE system. The uplink and/or the sidelink in the NR system uses the power allocated to the NR system.

In the same LTE system or the same NR system, the power allocation unit 00 may preferentially allocate the power for the data transmission starting firstly in the sidelink and the uplink.

If the power allocation unit 00 still has remaining power besides the power allocated to the LTE system and the power allocated to the NR system, for example, if the power allocation unit 00 still has remaining power after allocating the power greater than or equal to the first lowest power threshold allocated to the LTE system and the power greater than or equal to the second lowest power threshold to the NR system, the power allocated to the LTE system and the NR system is increased according to a preset proportion value. Wherein, the preset proportion value may be a ratio of the first lowest power threshold to the second lowest power threshold. Preferably, this mode may be applied to a case where the LTE system and the NR system are synchronous.

If a sum of the power allocated by the power allocation unit 00 to the LTE system and the NR system is greater than total power of the terminal, for example, after allocating the power less than or equal to the first highest power threshold allocated to the LTE system and the power less than or equal to the second highest power threshold to the NR system, the power allocated to the LTE system and the NR system is reduced according to a preset proportion value. Wherein, the preset proportion value may be a ratio of the first highest power threshold to the second highest power threshold. Preferably, this mode may be applied to a case where the LTE system and the NR system are synchronous.

The power allocation unit 00 may also adopt another allocation mode. That is, if the sum of the power allocated to the LTE system and the power allocated to the NR system is greater than the total power of the terminal, for example, after allocating power less than or equal to MAX1 to the LTE system and power less than or equal to MAX2 to the NR system, the power allocated to the LTE system and the NR system is reduced according to a preset third priority. Wherein, the preset third priority may include, for example, preferentially reducing transmission power of the sidelink with the QoS attribute state being less than the preset first threshold, or preferentially reducing transmission power of an uplink when the QoS attribute state of the sidelink is higher than the preset second threshold. Preferably, this mode may be applied to a case where the LTE system and the NR system are synchronous.

If the power allocation unit 00 still has remaining power besides the sum of the power allocated to the LTE system and the power allocated to the NR system, for example, if there is still remaining power after allocating the power greater than or equal to the first lowest threshold to the LTE system and the power greater than or equal to the second lowest threshold to the NR system, the remaining power may be preferentially allocated for data transmission starting firstly. Preferably, this mode may be applied to a case where the LTE system and the NR system are asynchronous.

There is also an implementation mode. That is, if the power allocation unit 00 still has remaining power besides the sum of the power allocated to LTE system and the power allocated to NR system, for example, there is still remaining power after allocating power greater than or equal to the first lowest threshold to the LTE system and power greater than or equal to the second lowest threshold to the NR system, the remaining power may be allocated according to a second priority of a channel type or a QoS attribute state. Preferably, this mode may be applied to a case where the LTE system and the NR system are synchronous.

Allocating the remaining power according to the QoS attribute state includes: preferentially increasing transmission power of the sidelink with the QoS attribute state being greater than a preset seventh threshold, or preferentially increasing transmission power of the uplink when the QoS attribute state of the sidelink is less than the preset seventh threshold.

There is also an implementation mode: the power allocation unit 00 does not perform data transmission of the LTE system and the NR system at the same time. Preferably, this mode may be applied to a case where the LTE system and the NR system are asynchronous.

Parameter information used for power allocation acquired by the parameter acquisition unit 10 from a network side may include the above priorities of the channel type (including the first priority of the channel type and the second priority of the channel type), the first lowest power threshold, the second lowest power threshold, the first highest power threshold, the second highest power threshold and various thresholds based on the QoS attribute state.

Implementation Fourteen

If an internet of vehicles system includes multiple cell groups, a base station may provide services of at least two cell groups for a terminal at the same time. Taking a first cell group and a second cell group as an example, the base station may provide services of the first cell group and the second cell group for the terminal at the same time, wherein one cell group may include more than one communication system. For example, the first cell group may include an LTE system and/or an NR system, and the second cell group may include the LTE system and/or the NR system. When one cell group includes the LTE system and the other cell group includes the NR system, it may correspond to the cases of the Implementation thirteen. Taking the first cell group and the second cell group as an example, a power allocation unit 00 allocates power greater than or equal to a preset third lowest power threshold to the first cell group and power greater than or equal to a preset fourth lowest power threshold to the second cell group. Wherein, at least one of the first cell group and the second cell group includes a sidelink.

Specifically, the power allocation unit 00 may allocate power less than or equal to a preset first highest power threshold to the first cell group and power less than or equal to a preset second highest power threshold to the second cell group. Wherein, at least one of the first cell group and the second cell group includes the sidelink.

The first cell group and/or the second cell group may include an uplink.

The uplink and/or the sidelink in the first cell group uses the power allocated to the first cell group, and the uplink and/or the sidelink in the second cell group uses the power allocated to the second cell group.

The power allocation unit 00 is further configured to, in the same cell group, preferentially allocate power for the data transmission starting firstly in the sidelink and the uplink.

The power allocation unit 00 is further configured to, in the same cell group, preferentially allocate power for the data transmission of the sidelink with the QoS attribute state being greater than or equal to a preset fifth threshold.

The power allocation unit 00 is further configured to, in the same cell group, if the QoS attribute state of the sidelink data is less than a preset sixth threshold, preferentially allocate power for an uplink transmission.

If the power allocation unit 00 still has remaining power besides a sum of the power allocated to the first cell group and the power allocated to the second cell group, for example, the power allocation unit 00 still has remaining power after allocating power greater than or equal to the third lowest power threshold allocated to the first cell group and power greater than or equal to the fourth lowest power threshold to the second cell group, the power allocated to the first cell group and the second cell group is increased according to a preset proportion value. Wherein, the preset proportion value is a ratio of the third lowest power threshold to the fourth lowest power threshold. Preferably, this mode is applied to a case where the first cell group and the second cell group are synchronous.

If the sum of the power allocated by the power allocation unit 00 to the first cell group and the power allocated by the power allocation unit 00 to the second cell group is greater than total power of the terminal, for example, after allocating power less than or equal to a third highest power threshold to the first cell group and power less than or equal to a fourth highest power threshold to the second cell group, the power allocated to the first cell group and the second cell group is reduced according to a preset proportion value. Wherein, the preset proportion value is a ratio of the third highest power threshold to the fourth highest power threshold. Preferably, this mode is applied to a case where the first cell group and the second cell group are synchronous.

If the sum of the power allocated by the power allocation unit 00 to the first cell group and the power allocated by the power allocation unit 00 to the second cell group is greater than the total power of the terminal, for example, after allocating power less than or equal to the first highest power threshold to the first cell group and power less than or equal to the second highest power threshold to the second cell group, the power allocated to the first cell group and the second cell group is reduced according to a preset fourth priority. Preferably, this mode is applied to a case where the first cell group and the second cell group are synchronous.

The preset fourth priority includes: preferentially reducing transmission power of the sidelink with the QoS attribute state being less than transmission power of the sideink of the preset third threshold, or preferentially reducing transmission power of an uplink when the QoS attribute state of the sidelink is greater than the preset third threshold.

If the power allocation unit 00 still has remaining power besides the sum of the power allocated to the first cell group and the power allocated to the second cell group, for example, there is still remaining power after allocating power greater than or equal to the third lowest threshold to the first cell group and power greater than or equal to a fourth threshold to the second cell group, the remaining power is allocated to the data transmission staring firstly. Preferably, this mode is applied to a case where the first cell group and the second cell group are asynchronous.

If the power allocation unit 00 still has remaining power besides the sum of the power allocated to the first cell group and the power allocated to the second cell group, for example, there is still remaining power after allocating power greater than or equal to the third lowest threshold to the first cell group and power greater than or equal to the fourth lowest threshold to the second cell group, the remaining power is allocated according to a third priority of a channel type or the QoS attribute state. Preferably, this mode is applied to a case where the first cell group and the second cell group are synchronous.

Allocating the remaining power according to the QoS attribute state includes: preferentially increasing transmission power of the sidelink with the QoS attribute state being higher than a preset eighth threshold, or preferentially increasing transmission power of the uplink when the QoS attribute state of the sidelink is less than the preset eighth threshold.

There may be another implementation mode. The power allocation unit 00 does not perform data transmission of the first cell group and data transmission of the second cell group at the same time. Preferably, this mode is applied to a case where the first cell group and the second cell group are asynchronous.

A parameter acquisition unit 10 acquires parameter information used for power allocation from a network side. Wherein, the parameter information includes at least one of the following:

a priority of a channel type on which power allocation is based;

a first lowest power threshold for allocating power for the first cell group;

a second lowest power threshold for allocating power for the second cell group;

a first highest power threshold for allocating power for the first cell group;

a second highest power threshold for allocating power for the second cell group; and various thresholds based on the QoS attribute state involved in this implementation.

Implementation Fifteen

A device arranged on a network side in the present disclosure may include a parameter configuration unit, configured to send parameter information used for power allocation of a user terminal to the user terminal.

Wherein, the above parameter information includes at least one of the following:

a priority of a channel type on which power allocation is based;

a first lowest power threshold for allocating power for an LTE system;

a second lowest power threshold for allocating power for an NR system;

a first highest power threshold for allocating power for an LTE system, a second highest power threshold for allocating power for an NR system;

a third lowest power threshold for allocating power for a first cell group;

a fourth lowest power threshold for allocating power for a second cell group;

a third highest power threshold for allocating power for a first cell group;

a fourth highest power threshold for allocating power for a second cell group; and a third threshold based on a QoS attribute state, a fourth threshold based on a QoS attribute state, a fifth threshold based on a QoS attribute state, a sixth threshold based on a QoS attribute state, a seventh threshold based on a QoS attribute state, and an eighth threshold based on a QoS attribute state.

Specifically, the parameter configuration unit may send the above parameter information to the user terminal through RRC signaling or MAC signaling.

The above method and device provided by the implementations of the present disclosure may be implemented in the form of one or more integrated circuits, such as codec chips, or may be completed by instructing relevant hardware through a program, which may be stored in a computer readable storage medium. Various units in the above implementations may be implemented in the form of hardware or in the form of a software functional module. The present disclosure does not limit a combination of any specific form of hardware and software.

For example, it may be realized by an apparatus, including:
one or more processors;
memory; and
one or more programs stored in the memory and executed by the one or more processors to implement the following operations:
allocating power for data transmission of a sidelink according to a preconfigured priority criterion.

In addition, with the development of technology over time, the meaning of media is becoming more and more extensive, and the transmission way of programs is no longer limited to tangible media, but may also be downloaded directly from the network, etc. Any combination of one or more computer readable media may be employed. The computer readable medium may be a computer readable signal medium or a computer readable storage medium. The computer readable storage medium may be, for example, but not limited to, an electrical, magnetic, optical, electromagnetic, infrared, or semiconductor system, apparatus, or device, or any combination thereof. Examples of computer readable storage media (a non-exhaustive list) include: electrical connections with one or more wires, portable computer disks, hard disks, random access memory, RAM, read only memory, ROM, erasable programmable read only memory (EPROM or flash memory), optical fibers, portable compact disk read only memory, CD-ROM, optical storage devices, magnetic storage devices, or any suitable combination of the above. In this disclosure, a computer readable storage medium may be any tangible medium containing or storing a program that may be used by or in connection with an instruction execution system, apparatus, or device.

The computer readable signal medium may include a data signal propagated in baseband or as part of a carrier wave, in which computer readable program code is carried. Such propagated data signals may take many forms, including, but not limited to, electromagnetic signals, optical signals, or any suitable combination of the above. The computer-readable signal medium may be any computer-readable medium other than a computer-readable storage medium, which may be used for sending, propagating, or transmitting programs for use by or in connection with an instruction execution system, apparatus, or device.

The above description is only exemplary implementations of the present disclosure, and is not intended to limit the present disclosure. Any modification, equivalent substitution, improvement and the like made within the spirit and principle of the present disclosure shall be included in the protection scope of the present disclosure.

What is claim is:

1. A method for power allocation of an internet of vehicles system, wherein a multi-carrier technology is adopted for a sidelink of the internet of vehicles system, the method comprises:
   allocating power for a data transmission of a sidelink according to a preconfigured priority criterion,
   wherein allocating the power for the data transmission of the sidelink according to the preconfigured priority criterion comprises:
   when the internet of vehicles system comprises a first cell group and a second cell group, allocating power greater than or equal to a preset lowest power threshold to the first cell group and power greater than or equal to another preset lowest power threshold to the second cell group;
   wherein at least one of the first cell group and the second cell group comprises the sidelink and an uplink,
   wherein, allocating the power for the data transmission of the sidelink according to the preconfigured priority criterion further comprises:
   in a same cell group, preferentially allocating power for a data transmission of the sidelink with a Quality of Service (QoS) attribute state being greater than or equal to a preset threshold;
   wherein allocating the power for the data transmission of the sidelink according to the preconfigured priority criterion further comprises:
   determining a channel type adopted by data to be transmitted, and allocating power for the data transmission according to a preconfigured first priority of the channel type; wherein the data to be transmitted comprises: data to be transmitted on the sidelink or data to be transmitted on the sidelink and an uplink; and
   for data of the same first priority of the channel type, allocating power for a corresponding data transmission according to a ProSe Per-Packet Priority (PPPP) or a Quality of Service (QoS) attribute of the data.

2. The method of claim 1, wherein allocating the power for the data transmission of the sidelink according to the preconfigured priority criterion comprises:
   allocating power for the data transmission of the sidelink according to a ProSe Per-Packet Priority (PPPP) of data to be transmitted on the sidelink.

3. The method of claim 1, wherein allocating the power for the data transmission of the sidelink according to the preconfigured priority criterion comprises:
   allocating power for the data transmission of the sidelink according to a Quality of Service (QoS) attribute of data to be transmitted on the sidelink.

4. The method of claim 1, wherein allocating the power for the data transmission of the sidelink according to the preconfigured priority criterion comprises:
   when the internet of vehicles system comprises an LTE system and an NR system, allocating power greater than or equal to a preset first lowest power threshold to the LTE system, and allocating power greater than or equal to a preset second lowest power threshold to the NR system;
   wherein, at least one of the LTE system and the NR system comprises the sidelink.

5. The method of claim 1, wherein allocating the power for the data transmission of the sidelink according to the preconfigured priority criterion comprises:
   when the internet of vehicles system comprises an LTE system and an NR system, allocating power less than or equal to a preset first highest power threshold to the LTE system, and allocating power less than or equal to a preset second highest power threshold to the NR system;

wherein, at least one of the LTE system and the NR system comprises the sidelink.

6. The method of claim 1, wherein allocating the power for the data transmission of the sidelink according to the preconfigured priority criterion comprises:

when the internet of vehicles system comprises a first cell group and a second cell group, allocating power less than or equal to a preset third highest power threshold to the first cell group and power less than or equal to a preset fourth highest power threshold to the second cell group;

wherein, at least one of the first cell group and the second cell group comprises the sidelink.

7. The method of claim 1, wherein allocating the power for the data transmission of the sidelink according to the preconfigured priority criterion comprises:

when the internet of vehicles system comprises an LTE system and an NR system, allocating power less than or equal to a preset first highest power threshold to the LTE system, and allocating power greater than or equal to a preset second lowest power threshold to the NR system; or, allocating power greater than or equal to a preset first lowest power threshold to the LTE system, and allocating power less than or equal to a preset second highest power threshold to the NR system;

wherein, at least one of the LTE system and the NR system comprises the sidelink.

8. The method of claim 1, wherein allocating the power for the data transmission of the sidelink according to the preconfigured priority criterion comprises:

when the internet of vehicles system comprises a first cell group and a second cell group, allocating power less than or equal to a preset third highest power threshold to the first cell group, and allocating power greater than or equal to the another preset lowest power threshold to the second cell group; or, when the internet of vehicles system comprises the first cell group and the second cell group, allocating power greater than or equal to the preset lowest power threshold to the first cell group, and allocating power less than or equal to a preset fourth highest power threshold to the second cell group;

wherein, at least one of the first cell group and the second cell group comprises the sidelink.

9. The method of claim 4, wherein the LTE system and/or the NR system comprises an uplink.

10. The method of claim 9, wherein, the uplink and/or the sidelink in the LTE system uses the power allocated to the LTE system; and the uplink and/or the sidelink in the NR system uses the power allocated to the NR system.

11. The method of claim 1, wherein, the uplink and/or the sidelink in the first cell group uses the power allocated to the first cell group; and the uplink and/or the sidelink in the second cell group uses the power allocated to the second cell group.

12. The method of claim 9, wherein, allocating the power for the data transmission of the sidelink according to the preconfigured priority criterion further comprises:

in a same LTE system or a same NR system, preferentially allocating power for a data transmission starting firstly in the sidelink and the uplink.

13. The method of claim 1, wherein, allocating the power for the data transmission of the sidelink according to the preconfigured priority criterion further comprises:

in a same cell group, preferentially allocating power for a data transmission starting firstly in the sidelink and the uplink.

14. An apparatus, comprising
one or more processors;
memory; and
one or more programs, stored in the memory, wherein the one or more programs, when executed by the one or more processors, are used for performing operations of:
when the internet of vehicles system comprises a first cell group and a second cell group, allocating power greater than or equal to a preset lowest power threshold to the first cell group and power greater than or equal to another preset lowest power threshold to the second cell group;
wherein at least one of the first cell group and the second cell group comprises the sidelink and an uplink,
wherein the one or more programs, when executed by the one or more processors, are further used for performing operations of:
in a same cell group, preferentially allocating power for a data transmission of the sidelink with a Quality of Service (QoS) attribute state being greater than or equal to a preset threshold;
wherein the one or more programs, when executed by the one or more processors, are further used for performing operations of:
determining a channel type adopted by data to be transmitted, and allocating power for the data transmission according to a preconfigured first priority of the channel type; wherein the data to be transmitted comprises: data to be transmitted on the sidelink or data to be transmitted on the sidelink and an uplink; and
for data of the same first priority of the channel type, allocating power for a corresponding data transmission according to a ProSe Per-Packet Priority (PPPP) or a Quality of Service (QoS) attribute of the data.

15. A non-transitory storage medium, comprising computer-executable instructions, wherein the computer-executable instructions, when executed by a computer processor, are used for performing operations of:
when the internet of vehicles system comprises a first cell group and a second cell group, allocating power greater than or equal to a preset lowest power threshold to the first cell group and power greater than or equal to another preset lowest power threshold to the second cell group;
wherein at least one of the first cell group and the second cell group comprises the sidelink and an uplink,
wherein the computer-executable instructions, when executed by a computer processor, are further used for performing operations of:
in a same cell group, preferentially allocating power for a data transmission of the sidelink with a Quality of Service (QoS) attribute state being greater than or equal to a preset threshold;
wherein the computer-executable instructions, when executed by the computer processor, are further used for performing operations of:
determining a channel type adopted by data to be transmitted, and allocating power for the data transmission according to a preconfigured first priority of the channel type; wherein the data to be transmitted comprises:

data to be transmitted on the sidelink or data to be transmitted on the sidelink and an uplink; and for data of the same first priority of the channel type, allocating power for a corresponding data transmission according to a ProSe Per-Packet Priority (PPPP) or a Quality of Service (QoS) attribute of the data.

\* \* \* \* \*